(12) United States Patent
Rapantzikos et al.

(10) Patent No.: US 11,768,871 B2
(45) Date of Patent: Sep. 26, 2023

(54) SYSTEMS AND METHODS FOR CONTEXTUALIZING COMPUTER VISION GENERATED TAGS USING NATURAL LANGUAGE PROCESSING

(71) Applicant: Entefy Inc., Palo Alto, CA (US)

(72) Inventors: Konstantinos Rapantzikos, Athens (GR); Alston Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 198 days.

(21) Appl. No.: 16/941,447

(22) Filed: Jul. 28, 2020

(65) Prior Publication Data

US 2021/0117467 A1    Apr. 22, 2021

Related U.S. Application Data

(63) Continuation of application No. 14/986,219, filed on Dec. 31, 2015, now abandoned.

(51) Int. Cl.
| | |
|---|---|
| *G06F 16/58* | (2019.01) |
| *G06F 16/51* | (2019.01) |
| *G06F 16/335* | (2019.01) |
| *G06F 16/33* | (2019.01) |
| *G06F 16/583* | (2019.01) |

(52) U.S. Cl.
CPC ........ *G06F 16/5866* (2019.01); *G06F 16/335* (2019.01); *G06F 16/3344* (2019.01); *G06F 16/51* (2019.01); *G06F 16/583* (2019.01)

(58) Field of Classification Search
CPC .... G06F 16/5866; G06F 16/583; G06F 16/51; G06F 16/3344; G06F 16/335

USPC ........................................................ 707/740
See application file for complete search history.

(56) References Cited

U.S. PATENT DOCUMENTS

| | | |
|---|---|---|
| 5,481,597 A | 1/1996 | Given |
| 5,951,638 A | 9/1999 | Hoss |
| 6,101,320 A | 8/2000 | Schuetze |
| 6,950,502 B1 | 9/2005 | Jenkins |

(Continued)

FOREIGN PATENT DOCUMENTS

| | | |
|---|---|---|
| WO | 9931575 | 6/1999 |
| WO | 2013112570 A1 | 8/2013 |

OTHER PUBLICATIONS

Guangyi Xiao et al., "User Interoperability With Heterogeneous IoT Devices Through Transformation," pp. 1486-1496, 2014.

(Continued)

*Primary Examiner* — Hosain T Alam
*Assistant Examiner* — Saba Ahmed
(74) *Attorney, Agent, or Firm* — Haynes and Boone, LLP

(57) ABSTRACT

This disclosure relates to systems, methods, and computer readable media for performing filtering of computer vision generated tags in a media file for the individual user in a multi-format, multi-protocol communication system. One or more media files may be received at a user client. The one or more media files may be automatically analyzed using computer vision models, and computer vision generated tags may be generated in response to analyzing the media file. The tags may then be filtered using Natural Language Processing (NLP) models, and information obtained during NLP tag filtering may be used to train and/or fine-tune one or more of the computer vision models and the NLP models.

20 Claims, 7 Drawing Sheets

(56) References Cited

U.S. PATENT DOCUMENTS

| | | |
|---|---|---|
| 7,317,929 B1 | 1/2008 | El-Fishawy |
| 7,450,937 B1 | 11/2008 | Claudatos |
| 7,673,327 B1 | 3/2010 | Polis |
| 7,680,752 B1 | 3/2010 | Clune, III |
| 7,734,705 B1 | 6/2010 | Wheeler, Jr. |
| 7,886,000 B1 | 2/2011 | Polis |
| 7,908,647 B1 | 3/2011 | Polis |
| 8,090,787 B2 | 1/2012 | Polis |
| 8,095,592 B2 | 1/2012 | Polis |
| 8,108,460 B2 | 1/2012 | Polis |
| 8,112,476 B2 | 2/2012 | Polis |
| 8,122,080 B2 | 2/2012 | Polis |
| 8,156,183 B2 | 4/2012 | Polis |
| 8,281,125 B1 | 10/2012 | Briceno |
| 8,296,360 B2 | 10/2012 | Polis |
| 8,433,705 B1 | 4/2013 | Dredze |
| 8,438,223 B2 | 5/2013 | Polis |
| 8,458,256 B2 | 6/2013 | Polis |
| 8,458,292 B2 | 6/2013 | Polis |
| 8,458,347 B2 | 6/2013 | Polis |
| 8,468,202 B2 | 6/2013 | Polis |
| 8,468,445 B2 | 6/2013 | Gupta |
| 8,521,526 B1 | 8/2013 | Lloyd |
| 8,527,525 B2 | 9/2013 | Fong |
| 8,959,156 B2 | 2/2015 | Polis |
| 9,088,533 B1 | 7/2015 | Zeng |
| 9,529,522 B1 | 12/2016 | Barros |
| 9,875,740 B1 | 1/2018 | Kumar |
| 11,334,768 B1 * | 5/2022 | Brody .................. G06N 3/0454 |
| 2002/0133509 A1 | 9/2002 | Johnston |
| 2002/0152091 A1 | 10/2002 | Nagaoka |
| 2002/0160757 A1 | 10/2002 | Shavit |
| 2002/0178000 A1 | 11/2002 | Aktas |
| 2002/0194322 A1 | 12/2002 | Nagata |
| 2003/0096599 A1 | 5/2003 | Takatsuki |
| 2004/0117507 A1 | 6/2004 | Torma |
| 2004/0137884 A1 | 7/2004 | Engstrom |
| 2004/0177048 A1 | 9/2004 | Klug |
| 2004/0243719 A1 | 12/2004 | Roselinsky |
| 2004/0266411 A1 | 12/2004 | Galicia |
| 2005/0015443 A1 | 1/2005 | Levine |
| 2005/0080857 A1 | 4/2005 | Kirsch |
| 2005/0101337 A1 | 5/2005 | Wilson |
| 2005/0198159 A1 | 9/2005 | Kirsch |
| 2006/0193450 A1 | 8/2006 | Flynt |
| 2006/0212757 A1 | 9/2006 | Ross |
| 2007/0054676 A1 | 3/2007 | Duan |
| 2007/0073816 A1 | 3/2007 | Kumar |
| 2007/0116195 A1 | 5/2007 | Thompson |
| 2007/0130273 A1 | 6/2007 | Huynh |
| 2007/0180130 A1 | 8/2007 | Arnold |
| 2007/0237135 A1 | 10/2007 | Trevallyn-Jones |
| 2007/0299796 A1 | 12/2007 | MacBeth |
| 2008/0062133 A1 | 3/2008 | Wolf |
| 2008/0088428 A1 | 4/2008 | Pitre |
| 2008/0112546 A1 | 5/2008 | Fletcher |
| 2008/0236103 A1 | 10/2008 | Lowder |
| 2008/0261569 A1 | 10/2008 | Britt |
| 2008/0263103 A1 | 10/2008 | McGregor |
| 2008/0288589 A1 | 11/2008 | Ala-Pietila |
| 2009/0016504 A1 | 1/2009 | Mantell |
| 2009/0119370 A1 | 5/2009 | Stern |
| 2009/0177477 A1 | 7/2009 | Nenov |
| 2009/0177484 A1 | 7/2009 | Davis |
| 2009/0177744 A1 | 7/2009 | Marlow |
| 2009/0181702 A1 | 7/2009 | Vargas |
| 2009/0187846 A1 | 7/2009 | Paasovaara |
| 2009/0271486 A1 | 10/2009 | Ligh |
| 2009/0292814 A1 | 11/2009 | Ting |
| 2009/0299996 A1 | 12/2009 | Yu |
| 2010/0057872 A1 | 3/2010 | Koons |
| 2010/0177938 A1 * | 7/2010 | Martinez ................ G06V 20/30 |
| | | 382/118 |
| 2010/0179874 A1 * | 7/2010 | Higgins ................ G06V 20/30 |
| | | 706/46 |
| 2010/0198880 A1 | 8/2010 | Petersen |
| 2010/0210291 A1 | 8/2010 | Lauer |
| 2010/0220585 A1 | 9/2010 | Poulson |
| 2010/0223341 A1 | 9/2010 | Manolescu |
| 2010/0229107 A1 | 9/2010 | Turner |
| 2010/0250578 A1 | 9/2010 | Athsani |
| 2010/0312644 A1 | 12/2010 | Borgs |
| 2010/0323728 A1 | 12/2010 | Gould |
| 2010/0325227 A1 | 12/2010 | Novy |
| 2011/0010182 A1 | 1/2011 | Turski |
| 2011/0051913 A1 | 3/2011 | Kesler |
| 2011/0078247 A1 | 3/2011 | Jackson |
| 2011/0078256 A1 | 3/2011 | Wang |
| 2011/0078267 A1 | 3/2011 | Lee |
| 2011/0130168 A1 | 6/2011 | Vendrow |
| 2011/0194629 A1 | 8/2011 | Bekanich |
| 2011/0219008 A1 | 9/2011 | Been |
| 2011/0265010 A1 | 10/2011 | Ferguson |
| 2011/0276640 A1 | 11/2011 | Jesse |
| 2011/0279458 A1 | 11/2011 | Gnanasambandam |
| 2011/0295851 A1 | 12/2011 | El-Saban |
| 2012/0016858 A1 | 1/2012 | Rathod |
| 2012/0209847 A1 | 8/2012 | Rangan |
| 2012/0210253 A1 | 8/2012 | Luna |
| 2012/0221962 A1 | 8/2012 | Lew |
| 2013/0018945 A1 | 1/2013 | Vendrow |
| 2013/0024521 A1 | 1/2013 | Pocklington |
| 2013/0067345 A1 | 3/2013 | Das |
| 2013/0097279 A1 | 4/2013 | Polis |
| 2013/0111487 A1 | 5/2013 | Cheyer |
| 2013/0127864 A1 | 5/2013 | Nevin, Iii |
| 2013/0151508 A1 | 6/2013 | Kurabayashi |
| 2013/0197915 A1 | 8/2013 | Burke |
| 2013/0232156 A1 * | 9/2013 | Dunn .................... G06F 16/957 |
| | | 707/752 |
| 2013/0262385 A1 | 10/2013 | Kumarasamy |
| 2013/0262852 A1 | 10/2013 | Roeder |
| 2013/0267264 A1 | 10/2013 | Abuelsaad |
| 2013/0268516 A1 * | 10/2013 | Chaudhri ............... G06Q 30/02 |
| | | 709/204 |
| 2013/0304830 A1 | 11/2013 | Olsen |
| 2013/0325343 A1 | 12/2013 | Blumenberg |
| 2013/0332308 A1 | 12/2013 | Linden |
| 2014/0020047 A1 | 1/2014 | Liebmann |
| 2014/0032538 A1 | 1/2014 | Arngren |
| 2014/0149399 A1 | 5/2014 | Kurzion |
| 2014/0270131 A1 | 9/2014 | Hand |
| 2014/0280460 A1 | 9/2014 | Nemer |
| 2014/0297807 A1 | 10/2014 | Dasgupta |
| 2014/0355907 A1 * | 12/2014 | Pesavento ............. G06F 16/583 |
| | | 382/305 |
| 2015/0019406 A1 | 1/2015 | Lawrence |
| 2015/0039887 A1 | 2/2015 | Kahol |
| 2015/0095127 A1 | 4/2015 | Patel |
| 2015/0134673 A1 * | 5/2015 | Golan ..................... G06F 16/44 |
| | | 707/748 |
| 2015/0149484 A1 | 5/2015 | Kelley |
| 2015/0186455 A1 | 7/2015 | Horling |
| 2015/0261496 A1 | 9/2015 | Faaborg |
| 2015/0278370 A1 | 10/2015 | Stratvert |
| 2015/0281184 A1 | 10/2015 | Cooley |
| 2015/0286747 A1 | 10/2015 | Anastasakos |
| 2015/0286943 A1 | 10/2015 | Wang |
| 2015/0339405 A1 | 11/2015 | Vora |
| 2016/0048548 A1 | 2/2016 | Thomas |
| 2016/0078030 A1 * | 3/2016 | Brackett ............. G06F 16/9535 |
| | | 707/754 |
| 2016/0087944 A1 | 3/2016 | Downey |
| 2016/0092959 A1 * | 3/2016 | Gross ................. G06Q 30/0625 |
| | | 705/26.62 |
| 2016/0173578 A1 | 6/2016 | Sharma |
| 2017/0039246 A1 | 2/2017 | Bastide |
| 2017/0039296 A1 | 2/2017 | Bastide |
| 2017/0206276 A1 | 7/2017 | Gill |
| 2017/0364587 A1 | 12/2017 | Krishnamurthy |

(56) References Cited

U.S. PATENT DOCUMENTS

2018/0048661 A1     2/2018   Bird
2018/0101506 A1     4/2018   Hodaei

OTHER PUBLICATIONS

Marr, Bernard, Key Business Analytics, Feb. 2016, FT Publishing International, Ch. 17 "Neural Network Analysis" (Year: 2016).

\* cited by examiner

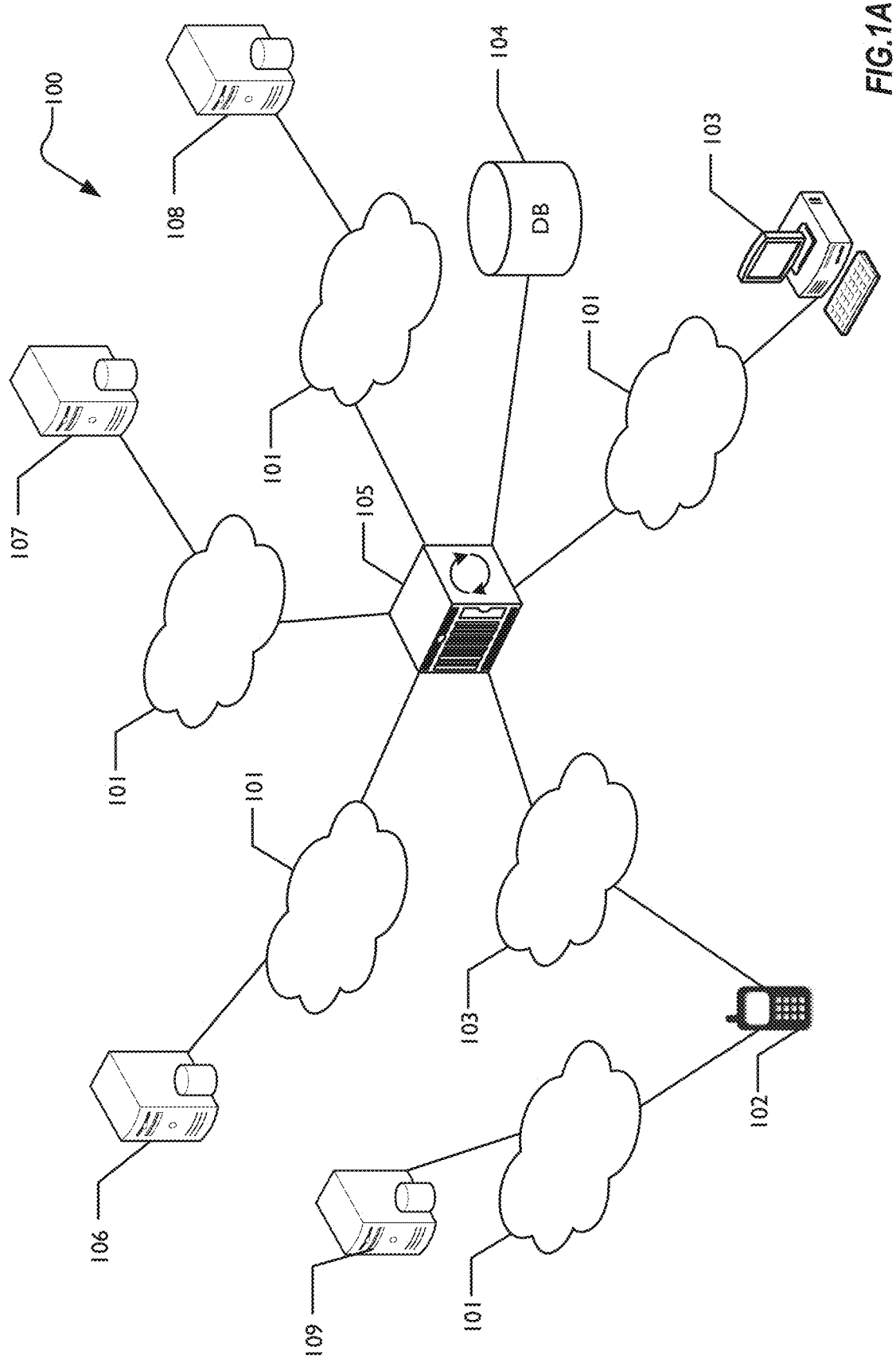

'gasmask'
'microphone'
'lenscap'
'barbell'
'dumbbell'

SYSTEMS AND METHODS FOR CONTEXTUALIZING COMPUTER VISION GENERATED TAGS USING NATURAL LANGUAGE PROCESSING

CROSS-REFERENCE TO RELATED APPLICATION

This application is a continuation of U.S. patent application Ser. No. 14/986,219, filed Dec. 31, 2015, and entitled "SYSTEMS AND METHODS FOR FILTERING OF COMPUTER VISION GENERATED TAGS USING NATURAL LANGUAGE PROCESSING" which is hereby incorporated by reference in its entirety.

TECHNICAL FIELD

This disclosure relates generally to systems, methods, and computer readable media for filtering of computer vision generated tags using natural language processing and computer vision feedback loops.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to a communication experience that many users find fragmented and difficult to search for relevant information in these communications. Users desire a system that will discern meaningful information about visual media that is sent and/or received across multiple formats and communication protocols and provide more relevant universal search capabilities, with ease and accuracy.

In a multi-protocol system, messages can include shared items that include files or include pointers to files that may have visual properties. These files can include images and/or videos that lack meaningful tags or descriptions about the nature of the image or video, causing users to be unable to discover said content in the future via search or any means other than direct user lookup (i.e., a user specifically navigating to a precise file in a directory or an attachment in a message). For example, a user may have received email messages with visual media from various sources that are received through emails in an email system over the user's lifetime. However, due to the passage of time, the user may be unaware where the particular visual media (e.g., image/picture and video) may have been stored or archived. Therefore, the user may have to manually search through the visual images or videos so as to identify an object, e.g., an animal or a plant that the user remembers viewing in the visual media when it was initially received. This can be time consuming, inefficient and frustrating for the user. In some cases wherein the frequency of visual media sharing is high, this process can result in a user not being able to recall any relevant detail of the message for lookup (such as exact timeframe, sender, filename, etc.) and therefore "lose" the visual media, even though the visual media is still resident in its original system or file location.

Recently, a great deal of progress has been made in large-scale object recognition and localization of information in images. Most of this success has been achieved by enabling efficient learning of deep neural networks (DNN), i.e., neural networks with several hidden layers. Although deep learning has been successful in identifying some information in images, a human-comparable automatic annotation of images and videos (i.e., producing natural language descriptions solely from visual data or efficiently combining several classification models) is still far from being achieved.

In large systems, recognition parameters are not personalized at a user level. For example, recognition parameters may not account for user preferences when searching for content in the future, and can return varying outputs based on a likely query type, importance, or object naming that is used conventionally (e.g., what a user calls a coffee cup versus what other users may call a tea cup, etc.). Therefore, the confidence of the output results may change based on the query terms or object naming.

The subject matter of the present disclosure is directed to overcoming, or at least reducing the effects of, one or more of the problems set forth above. To address these and other issues, techniques that enable filtering or "de-noising" computer vision-generated tags or annotations in images and videos using feedback loops are described herein.

BRIEF DESCRIPTION OF THE DRAWINGS

FIG. 1A is a block diagram illustrating a server-entry point network architecture infrastructure, according to one or more disclosed embodiments.

DETAILED DESCRIPTION

Figure 1B:
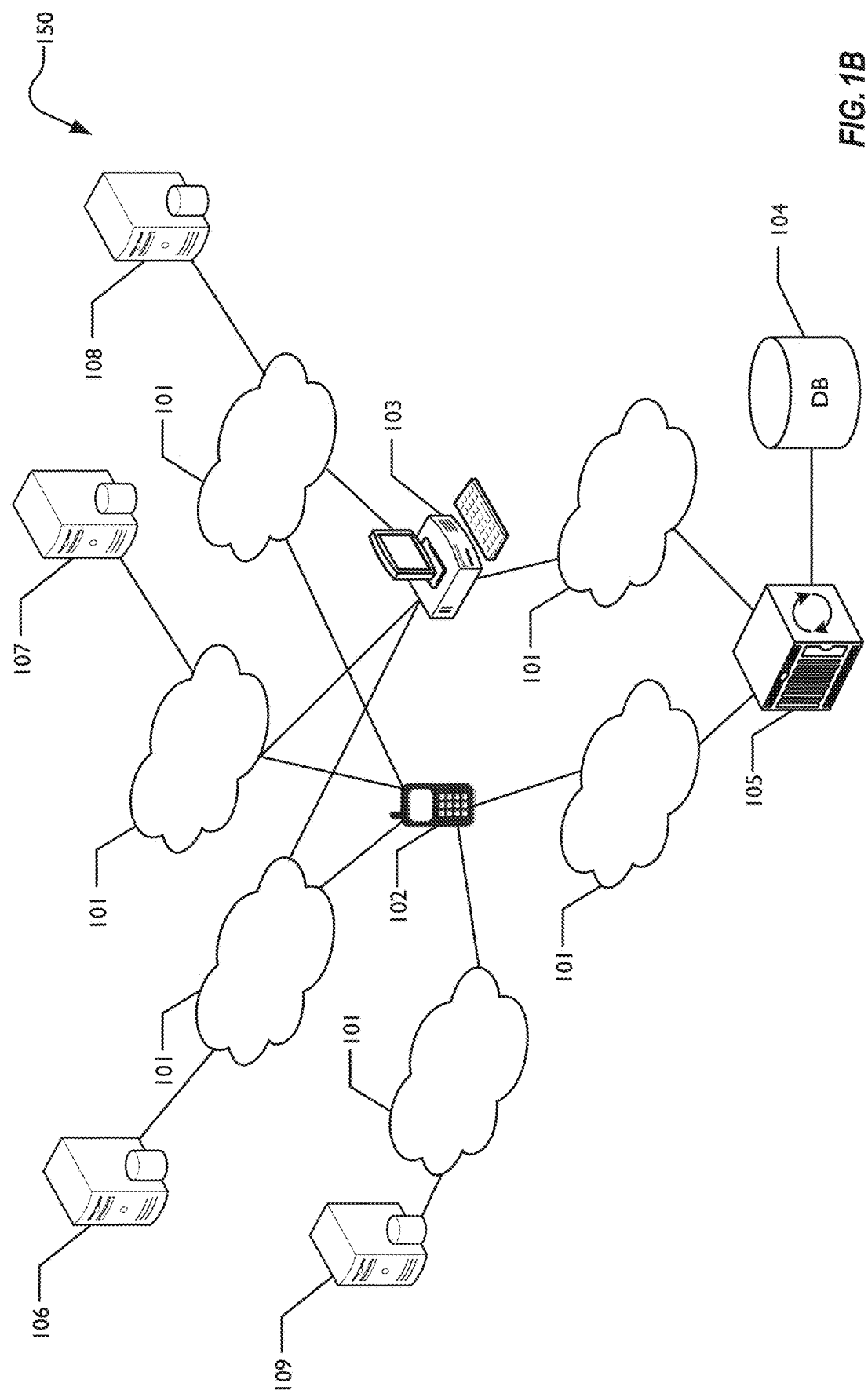
FIG. 1B is a block diagram illustrating a client-entry point network architecture infrastructure, according to one or more disclosed embodiments.

Disclosed are systems, methods, and computer readable media for extracting meaningful information about the nature of a visual item in computing devices that have been shared with participants in a network across multiple formats and multiple protocol communication systems. More particularly, but not by way of limitation, this disclosure relates to systems, methods, and computer readable media to permit computing devices, e.g., smartphones, tablets, laptops, wearable devices, and the like, to detect and establish meaningful information in visual images across multi-format/multi-protocol data objects that can be stored in one or more centralized servers. Also, the disclosure relates to systems, methods, and computer-readable media to run visual media through user-personalized computer vision learning services to extract meaningful information about the nature of the visual item, so as to serve the user more relevant and more universal searching capability. For simplicity and ease of understanding, many examples and embodiments are discussed with respect to communication data objects of one type (e.g., images). However, unless otherwise noted, the examples and embodiments may apply to other data object types as well (e.g., audio, video data, emails, MMS messages).

As noted above, the proliferation of personal computing devices and data object types has led to a searching experience that many users find fragmented and difficult. Users desire a system that will provide instant and relevant search capabilities whereby the searcher may easily locate a specific image or video which has been shared with them using any type of sharing method and which may or may not contain any relevant text-based identification matching the search query strand such as a descriptive filename, meta data, user-generated tags, etc.

As used herein, computer vision can refer to methods for acquiring, processing, analyzing, and understanding images or videos in order to produce meaningful information from the images or videos.

In at least one embodiment, a system, method, and computer-readable media for filtering Computer Vision (CV) generated tags or annotations on media files is disclosed. The embodiment may include running or implementing one or more image analyzer (IA) models from an image analyzer (IA) server on the media files for generating CV tags. In an embodiment, the models can include object segmentation, object localization, object detection/recognition, natural language processing (NLP), and a relevance feedback loop model for training and filtering.

In another embodiment, the image analyzers (IA) may be sequenced based on a particular user and the evolving nature of algorithms. For example, the sequencing of IA analyzer models may change as algorithms for actual NLP detection, classification, tagging, etc. evolve. The sequencing of IA analyzer models may also be changed based on user. For example, knowing that user A typically searches for people and not scenery, the AI sequencing may be adjusted to run additional models for facial recognition and action detection, while avoiding models for scene detection.

In another embodiment, the relevance feedback model can include a feedback loop where 'generic' tags that are created for objects may be processed or filtered with personalized NLP and searches for the filtered tags in the 'specific object' or 'segmentation' models, and, if there is a match, then the tags' confidence may be increased. This loop may be repeated until a desired overall confidence threshold is reached.

In another embodiment, an object segmentation model may be run on image files that may have been shared with the user in a multi-protocol, multi-format communication system. The object segmentation model may be configured to analyze pictures using one or more algorithms, so as to identify or determine distinct objects in the picture. In an embodiment, an object localization model may be performed on the image, along with each of the detected 'pixel-level masks' (i.e., the precise area that the object covers in the image), to identify locations of distinct objects in the image. Object localization may be used to determine an approximation of what the objects are and where the objects are located in the image.

In an embodiment, deep object detection may be implemented by using one or more image corpora together with NLP models to filter CV generated tags. NLP methods may be used to represent words and contextually analyze tags in text form. An NLP model may allow for a semantically meaningful way to filter the tags and identify outliers in the CV generated tags.

In another embodiment, a relevance feedback loop may be implemented, whereby the NLP engine may filter, or "de-noise," the CV generated tags by detecting conceptual similarities to prioritize similar tags and deprioritize irrelevant tags. For example, when the system detects a questionable tag (i.e., confidence level is low), the system may recheck the tag to ascertain whether discarding the tag is advised. Furthermore, a CV tag-filtering engine based on a training set annotated at the bounding-box level (object's location) may create rules related to the spatial layout of objects and therefore adapt the NLP classifier to filter related definitions based on these layouts. For example, in everyday photos/images, the 'sky' is usually above the 'sea'. The system may search for pictures from external datasets based on the subject of the discarded tag to verify whether removing the outlier was accurate. Results obtained from the search may be used to train NLP and computer vision using the images in the image dataset of the subject matter of the discarded tag.

In a non-limiting example, a user might want to find a picture or image that a certain person (e.g., his friend Bob) sent to him that depicts a certain subject (e.g., Bob and Bob's pet Llama), via a general query. The universal search approach of this disclosure allows a user to search for specific items—but in a general way—using natural language, regardless of the format or channel through which the message/file came. So, the user could, for example, search for "the picture Bob sent me of him with his Llama" without having to tell the system to search for a JPEG file or the like. The user could also simply search for "Llama" or "'Bob' and 'animal'" to prompt the search system to identify the image via it's CV tags (which contain general concepts such as "animal" and specific concepts such as "Bob" and "Llama"), as opposed to locating the image via filename, metadata, message body context, or any other standard parameter.

As new data/content is on-boarded into the system, the data/content can be categorized and sharded, and insights that can be derived from analyzing the data, for example, language patterns, can be used to create an overarching user-personality profile containing key information about the user. That key information can be used to influence the weights of the various criteria of the index analyzer for that particular user. The index analyzer for a particular user can be automatically updated on an ongoing, as-needed, as-appropriate, or periodic basis, for example. Additionally, a current instance of an analyzer can be used by a user to perform a search, while another (soon to be more current) instance of the analyzer updates. Thus, for example, the words and expressions that a particular user uses when searching, can become part of a machine learned pattern. If a user on-boards email accounts, an index analyzer will pull historical data from the accounts and analyze that data. One or more analyzers discussed herein can comprise one or more variations of algorithms running independently or in combination, sequentially, or in parallel.

Referring now to FIG. 1A, a server-entry point network architecture infrastructure 100 is shown schematically. Infrastructure 100 contains computer networks 101. Computer networks 101 include many different types of computer networks, such as, but not limited to, the World Wide Web, the Internet, a corporate network, and enterprise network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 103 for use with mobile communication devices. Cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multi-format communication composition and inbox feed system to be described herein. Sync server can comprise an image analyzer (IA) server, or be in signal with an external IA server (not shown). In the server-entry point network architecture infrastructure 100 of FIG. 1A, centralized sync server 105 may be responsible for querying and obtaining all the messages from the various communication sources for individual users of the system and keeping the multi-protocol, multi-format communication inbox feed for a particular user of the system synchronized with the data on the various third party communication servers that the system is in communication with. Database(s) 104 may be used to store local copies of messages sent and received by users of the system, data objects of various formats, as well as individual documents associated with a particular user, which may or may not also be associated with particular communications of the users. Database(s) can be used to store an image dataset organized according to a particular subject matter area and personalization information by a particular user. As such, the database portion allotted to a particular user can contain image information for a particular user that maps to a global dataset/corpus of images related to a subject matter area.

Server 106 in the server-entry point network architecture infrastructure 100 of FIG. 1A represents a third party email server (e.g., a GOOGLE® or YAHOO! ® email server). (GOOGLE is a registered service mark of Google Inc. YAHOO! is a registered service mark of Yahoo! Inc.). Third party email server 106 may be periodically pinged by sync server 105 to determine whether particular users of the multi-protocol, multi-format communication composition and inbox feed system described herein have received any new email messages via the particular third-party email services. Server 107 represents a represents a third party instant message server (e.g., a YAHOO! ® Messenger or AOL® Instant Messaging server). (AOL is a registered service mark of AOL Inc.). Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc.; TWITTER is a registered service mark of Twitter, Inc.). Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' users are communicating with one another via the multi-protocol, multi-format communication system itself, such communications may occur entirely via sync server 105, and third party servers 106-109 may not need to be contacted.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
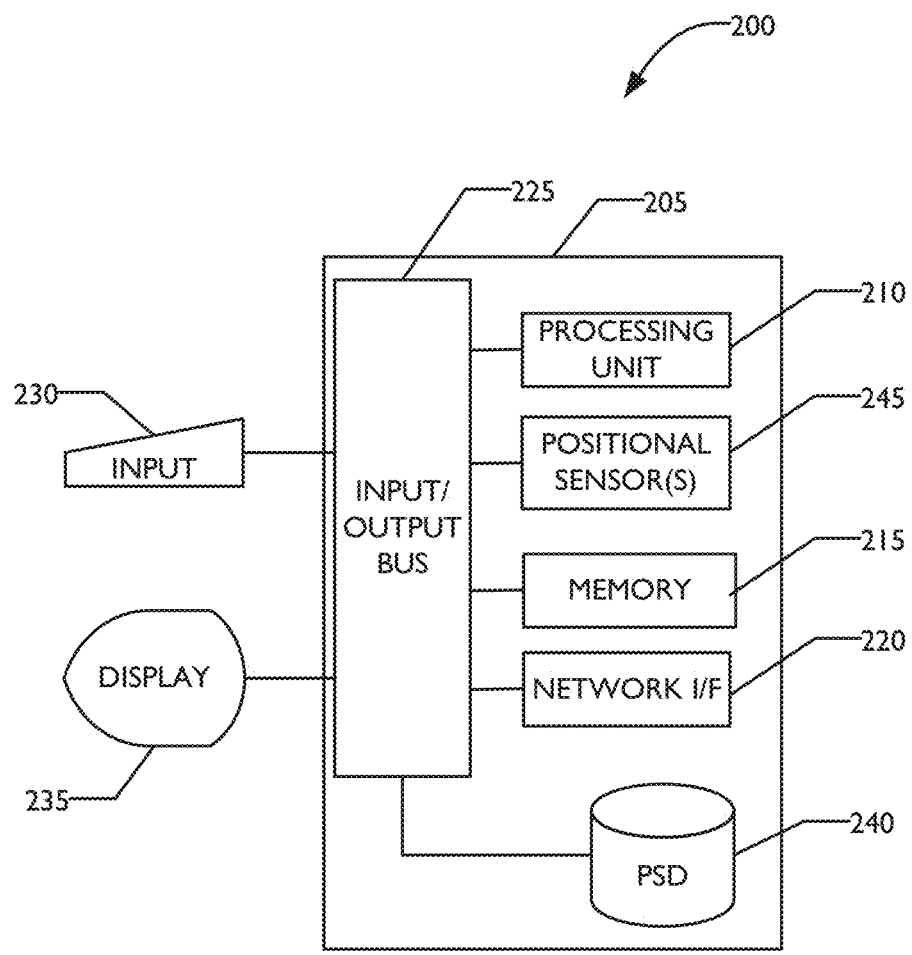
FIG. 2A is a block diagram illustrating a computer which could be used to execute the multi-format, multi-protocol contextualized indexing approaches describe d herein according to one or more disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
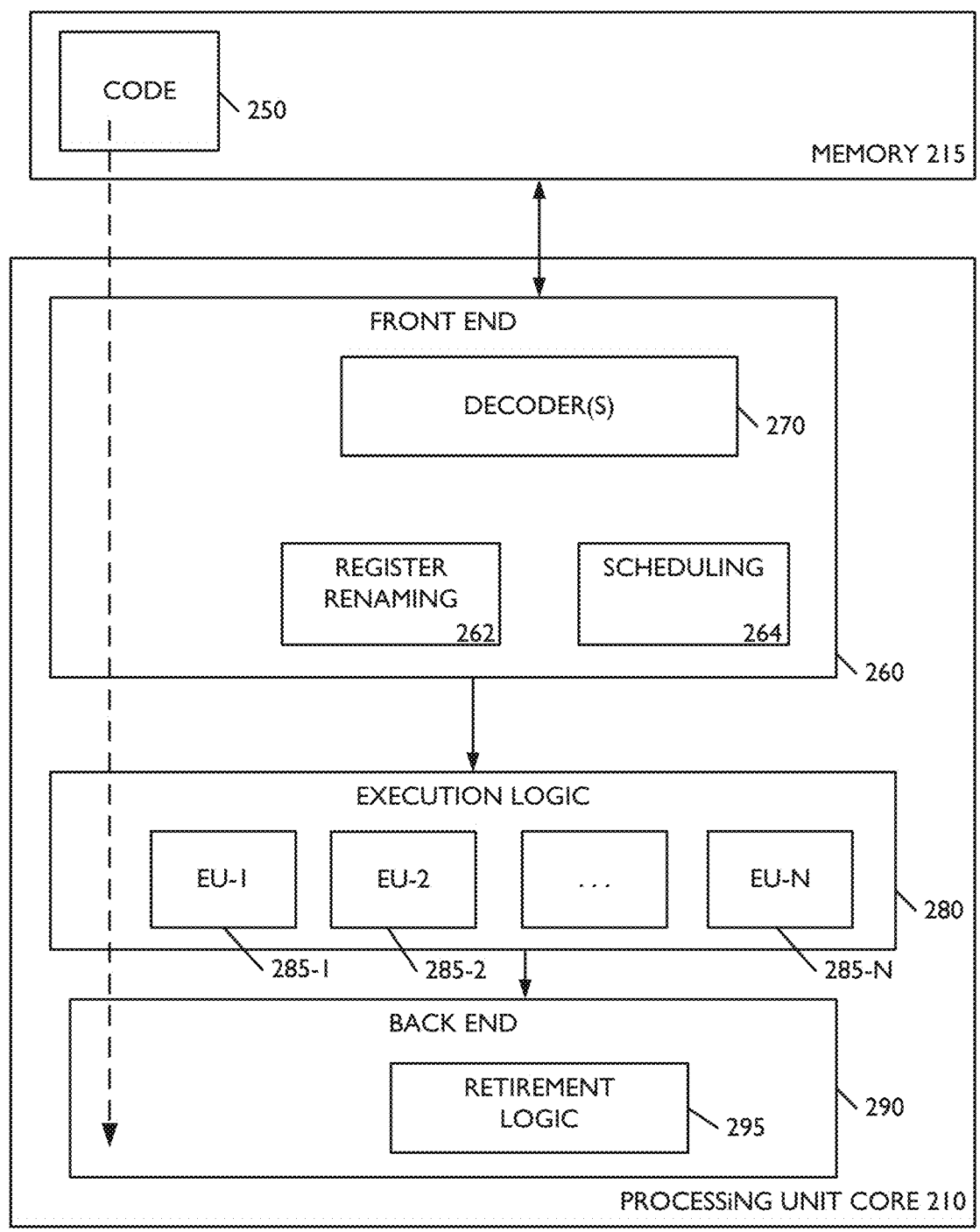
FIG. 2B is a block diagram illustrating a processor core, which may reside on a computer according to one or more disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Figure 3:
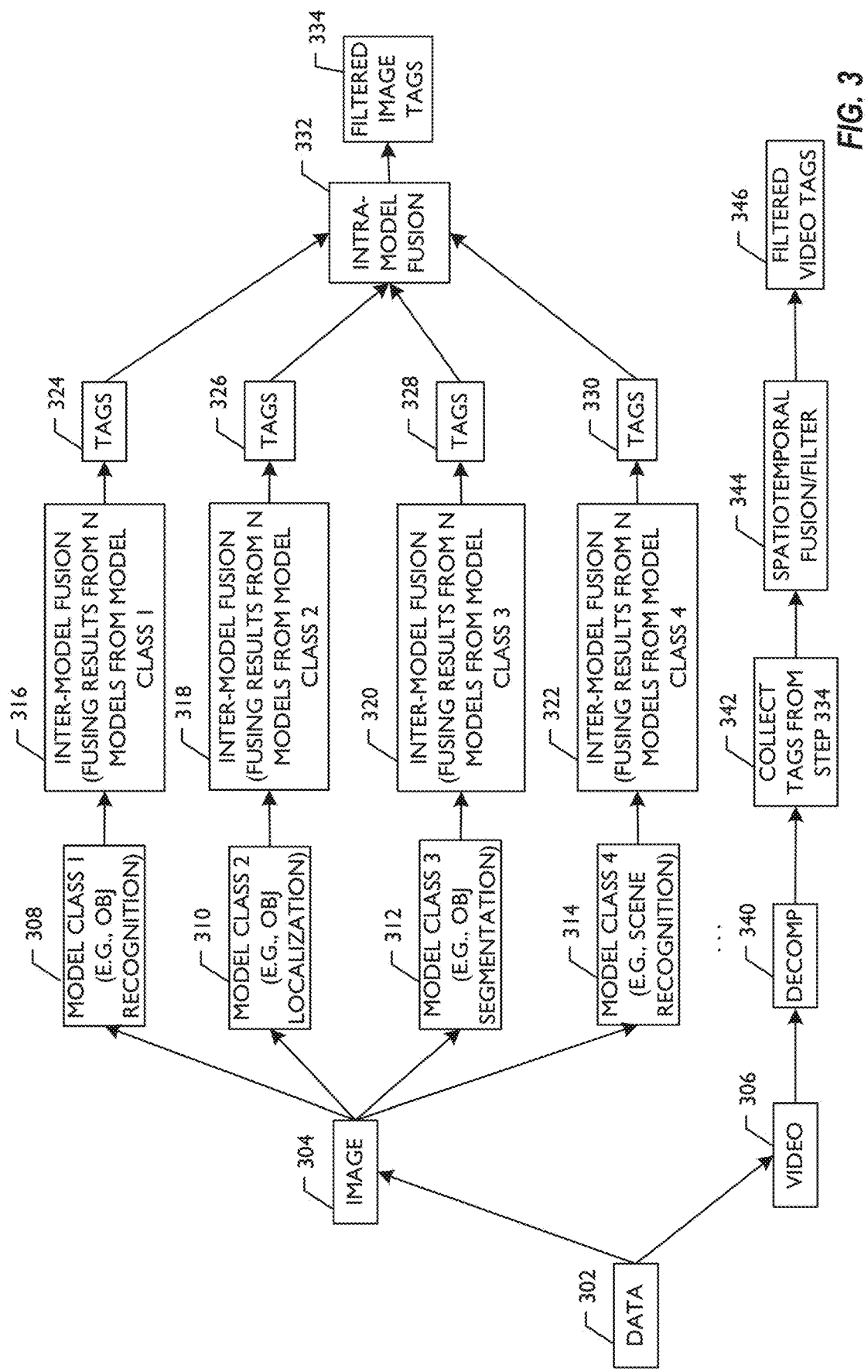
FIG. 3 is a flow diagram illustrating an example of a method for filtering computer vision generated tags, according to one or more disclosed embodiments.

FIG. 3 illustrates an example dataflow diagram 300 for filtering Computer Vision (CV) generated tags or annotations on media files, according to one or more disclosed embodiments. Data flow diagram 300 may include running or implementing one or more image analyzer (IA) models on the media files for generating computer vision tags fora user. In some embodiments, data flow 300 may be implemented on images/pictures by static recognition of frames, and/or it may be implemented on videos (e.g., on a per-frame basis for all frames in the video, or for select frames in the video based on performing a scene change detection analysis), e.g., via the performance of spatiotemporal decomposition of each said frame in the video. In some non-limiting embodiments, the IA models can include object segmentation, object localization, object detection, scene recognition, and other various NLP methods to aid in the tag "fusion" process. In another embodiment, the IA models may be sequenced based on a particular user and the evolving nature of algorithms. For example, the sequencing of IA analyzer models may be changed as algorithms for actual NLP detection, classification, tagging, etc. evolve through relevance feedback loops. The sequencing of IA analyzer models may also be changed based on user preferences. For example, knowing that a particular user typically searches for people and not scenery, the AI sequencing may be adjusted for that particular user to run additional models such as facial recognition and action detection while avoiding models for scene detection.

Data flow 300 starts at 302 where messaging content may be received and imported into a multi-protocol, multi-format communication system on a user client device (or user-client). For example, messaging content may be received as messages and/or other shared items that can include media files or point to media files within the message. Media files may include visual properties such as, for example, pictures or videos that may be included in the messaging content. In an embodiment, the messaging content including the media files (for example, pictures/images or videos) may be displayed to the user as messaging content in a user interface at a client application.

Next, one or more image analyzer (IA) models may be automatically run on the images and videos to determine computer vision tags or annotations for one or more distinct objects in the images (in 304) or videos (in 306). Media files that are received may be separated into images and videos, and one or more IA models may be run on the images and videos based on the format of the media files.

As shown in FIG. 3, messaging content that is received as video (in 306) may be decomposed by extracting all sequential frames or a discrete sample of frames or groups of frames based on a scene detection algorithm in 340. Next, in 342, tags may be identified and collected from output of filtered image tags (in 334). Next, in 344, a spatiotemporal fusion model may be run. The spatiotemporal fusion model may combine insights obtained from each frame such as, for example, the tags obtained in 342 may be filtered based on spatial and temporal constraints. The filtered tags along with the accompanying timestamps may be collected to form a semantically meaningful representation of the video sequence.

Also shown in FIG. 3, messaging content that is received as images may be analyzed using one or more AI models. The one or more AI models may be performed in parallel or serially. FIG. 3 illustrates a parallel scheme of implementing the one or more AI models on images.

Object detection may be run on the image in 308. In an embodiment, object detection may be implemented as one or more object detection models to determine generic classes of objects. The object detection model analyzes the image to determine tags for generic categories of items in the image such as, for example, determining tags at different abstraction levels such as person, automobile, plant, animal or the like, but also dog, domestic doc, Labrador dog. Inter-model fusion may be performed in 316, whereby tags obtained from running several object detection models on the image may be combined to generate tags in 324 defining labels for each detected object.

Object localization may be run on the image in 310. In an embodiment, object localization may be implemented as one or more object localization models. For example, one or more object localization models may be performed on the image to identify locations of distinct objects in the image. Object localization may be used to determine an approximation of what the objects are (i.e., labels) and where the objects are located (i.e., object window defining pixel coordinates (x, y, width, height) on the image. Inter-model fusion may be performed in 318 whereby tags obtained from running several object detection models on the image may be combined to generate tags in 326 defining labels and boundaries for each detected object.

Object segmentation may be run on the image in 312. Object segmentation may be implemented as one or more object segmentation models. In an embodiment, an object segmentation model may analyze the image to identify or determine distinct objects in the image (i.e., labels) and segmentation mask/object outline of the object (i.e., pixels identified to a cluster in which they belong) such as, for example, 'animal' and its mask or 'table' and its mask. In an example of a picture/image of a conference room having chairs and a conference table, object segmentation may be performed to segment the image by identifying one or more objects in the picture such as, for example, identification of three objects where each object may be one of the chairs in the image. In an embodiment, one or more additional object segmentation models may be applied to recognize faces and humans in the image. Object segmentation may generate a segmentation map that may be used to filter tags obtained in other IA models. Inter-model fusion may be performed in 320, whereby tags obtained from running several object segmentation models on the image may be combined to generate tags in 328 that define labels and segmentation mask/object outline for each detected object.

Scene/place recognition may be performed on the image in 314. In an embodiment, scene/place recognition may be implemented as one or more scene/place recognition modes that may be trained to recognize the scenery depicted in the image, for example, scenery defining outdoors, indoors, sea or ocean, seashore, beach, or the like. Model fusion may be performed in 322, whereby tags obtained from running several scene recognition models on the image may be combined to generate tags in 330 that define scenes in the image. For example, the scene/place recognition model may be used to enrich the set of tags obtained from models 308, 310, 312 and drive the filtering of tags in 308, 310, 312 by filtering out conceptual mismatches to determine whether an object detected in another model 308, 310, 312 may be found at the location in the image, for example, a dog cannot be detected at a location where sky is identified in the image.

In an embodiment, deep detection may use a deep neural network (DNN) that may produce meaningful tags that provide a higher precision of detection after proper training on a large set of images belonging to all desired categories. For training the DNN, one may use one or more sets of annotated images (generally referred to as a dataset or corpus) as a baseline. An image dataset/corpus may be a set of annotated images with known relational information that have been manually tagged and curated. In one example, a baseline image dataset/corpus that may be used can be a subset of the image-net dataset (which is available at http://www.image-net.org/). In an example, the image dataset/corpus may be augmented by web crawling other image sources and combining these image sources into the baseline dataset/corpus for training the image dataset/corpus. In another embodiment, an image dataset/corpus may be trained by using textual information that may be received in a message that has been shared with the user. For example, textual information received in a message, either in the body or subject line such as, for example, "an image of a plane" may be used to identify tags or annotations that may be used for content in the image.

In an embodiment, after generic classification (in 308), or localization (in 310), or segmentation (in 312), or scene detection (in 314), the image in 304 may be further analyzed through a specific model based on one or more categories that were identified in the image. For example, if one of the pieces of the image was classified as belonging to a plant category, the image may be analyzed through a specific plant dataset/corpus for identifying the specific type of plant using the plant dataset/corpus. Alternatively, if the image was classified as a glass category, the image may be classified as a specific utensil such as, for example, classified as a cup. These insights may be gathered for the entire image using models that may be implemented based on the category that were identified for the objects in the image. Particularly, the system may gather insights (i.e., identification of tags for the image) during implementing one or more of the specific models on the pieces of the image and store these tags in memory. In an embodiment, results that are obtained from implementing one or more models may be ranked based on a confidence level.

Next, in 332, after generic classification (in 308), localization (in 310), segmentation (in 312) or scene detection (in 314), intra-model fusion may be performed on the outputs of tags determined in steps 324, 326, 328, and 330. In an embodiment, the system may combine tags obtained from each model (in 324, 326, 328, and 330) (to combine the insights from the several models for, in embodiments and determine tags of different nature. For example, the results from combining insights are concatenated. Information that is concatenated is used to break up the image intelligently so that each object does not include portions of other objects (i.e., an object contour does not include portions of other objects in the image). For example, in an image with a person and a car, the image may be intelligently broken up so that the face of the person is distinct from portions associated with the car so that the system can identify objects in the image, how big the objects are in relation to other objects in the image and their location in the image. The output of intra-model fusion may produce tags for objects and their confidence values for the object tags in the image.

In an embodiment, in intra-level fusion (in 332), the system may weight importance of the objects in the image using a depth model. The depth model may determine depth or focus in the image in order to perceive if the objects identified in the image may be further back or closer in front. For example, based on a determination that an object identified is further back, a rule may be implemented that rates the object as less important. Similarly, another rule may weight an object more important if it has less depth. An index of weights for the image may be determined based on the depth model that may be implemented on the image.

Next, in 334, a Natural Language Processing (NLP) model may be implemented to filter the tags that are generated in intra-model fusion (in 332). In some embodiments, tag filtering can include inter-level and intra-level tag filtering. Filtering may be used to filter the automatically generated tags by selecting tags having the highest confidence values and/or selecting tags that are conceptually closer.

Inter-Level Tag Filtering

Object detection models may be of similar nature or not, i.e. trained to detect a large variety of objects (e.g. hundreds of object classes) hereby called 'generic,' or trained to detect specific objects (e.g. tens of classes or even of single class such as human faces, pedestrians, etc.) hereby called 'specific.'

Figure 4:
FIG. 4 is a diagram for an exemplary image that depicts computer generated tags in order of confidence level.

Running object detection models of similar nature, i.e., of only 'generic' or only 'specific', may produce competing lists of tags with the same or similar properties that may also containing different assessed confidence values. Inter-level tag filtering may use confidence re-ranking and NLP-base methods to filter and prioritize those tags by, for example, 1) selecting the tags that are conceptually closer; and 2) accumulating the confidence of those tags and selecting the most confident ones. For example, as shown in FIG. 4, running one or more object detection models may produce one or more lists automatically-extracted annotations or tags for the image of a person holding a microphone. By filtering and/or sorting the tags as before, such a system may intelligently select the 5 tags with the highest assessed confidence values, i.e. 'gasmask'—45%, 'microphone'—22%, lens cap—15%, barbell—10%, dumbbell—8%. NLP may be applied in order to infer the "natural" meanings of those tags and therefore detect an "outlier", i.e. the tag that is conceptually less similar to the rest. For the illustrated example in FIG. 4, using a NLP classifier, the outlier could be a 'gasmask'.

Intra-Level Tag Filtering

Running object detection models of different nature, i.e., of 'generic' and 'specific' nature, may produce competing or complementary lists of tags and confidence values, e.g. tags such as 'Labrador Retriever', 'gun dog', 'dog', 'domestic dog', 'Canis lupus familiaris', 'animal', 'cat', 'street'). Intra-level filtering based on NLP methods may produce a natural hierarchy of those tags by removing the outliers ('cat', 'street') as in the inter-level filtering case and by also creating an abstract-to-less-abstract hierarchy ('animal', 'dog', 'domestic dog', 'gun dog', 'Labrador Retriever', 'Canis lupus familiaris').

Using NLP methods to represent words and contextually analyze text, the NLP model may learn to map each discrete word in a given vocabulary (e.g., a Wikipedia corpus) into a low-dimensional continuous vector space based on simple frequencies of occurrence. This low-dimensional representation may allow for a geometrically meaningful way of measuring distance between words, which are treated as points in a mathematically tractable manifold. Consequently, the top-5 tags of FIG. 4 may be re-ranked based on their pairwise distance in the new manifold and therefore make possible outliers stand out because of a large distance value. In the example of FIG. 4, gasmask may be conceptually dissimilar to other tags in the list.

In an embodiment, a relevance feedback loop may be implemented whereby the NLP engine may "de-noise" the CV generated tags by detecting conceptual similarities to prioritize similar tags and de-prioritize irrelevant tags. For example, when the system detects a questionable tag (i.e., confidence level is low), the system may recheck the tag to ascertain whether discarding the tag is advised. Furthermore, the CV tag engine based on a training set annotated at the bounding-box level (object's location) may create rules related to the spatial layout of objects and therefore adapt the NLP classifier to filter related definitions based on these layouts. For example, in everyday photos/images, the 'sky' is—usually—above the 'sea'. The system may search for pictures from external datasets based on the subject of the discarded tag to verify whether removing the outlier was accurate. Results obtained from the search may be used to train NLP and computer vision using the images in the image dataset of the subject matter of the discarded tag."

Figure 5:
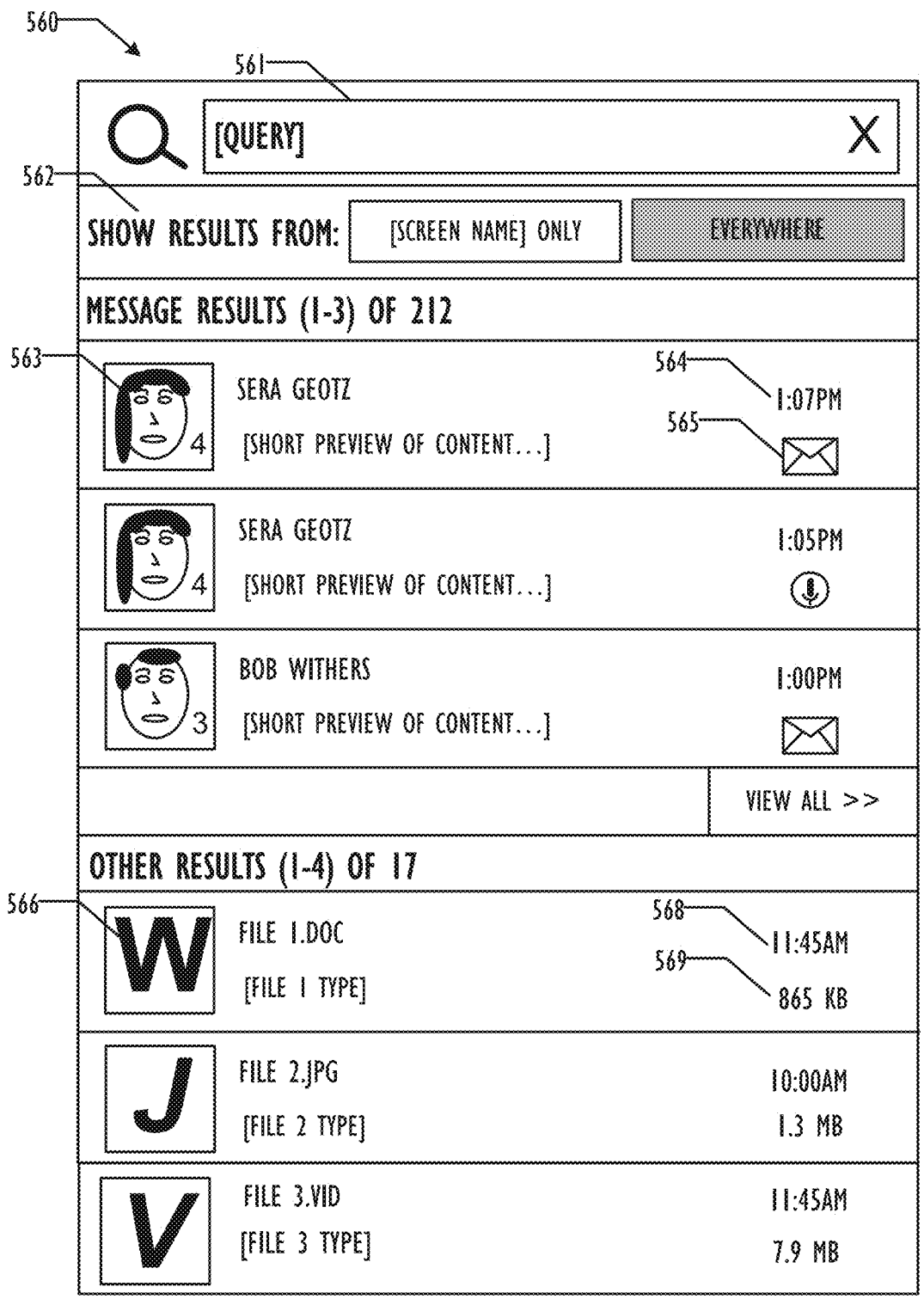
FIG. 5 shows an example of a multi-format, multi-protocol, universal search results page for a particular query, according to one or more disclosed embodiments.

Referring now to FIG. 5, an example of a multi-format, multi-protocol communication universal search results page 560 fora particular query is shown, according to one or more disclosed embodiments. At the top of page 560 may be a search input box 561. A user may enter his or her desired query string into the search input box 561 and then click on the magnifying glass icon to initiate the search process. Search results row 562 may be used for providing the user with a choice of additional search-related features. For example, the user may be provided with a selection between a "global" search, i.e., searching everywhere in the application's ecosystem, and a "narrow" search, i.e., searching only through content on a screen or small collection of screens. As shown in FIG. 5, search results 563 may be displayed in a unified feed or can be grouped by type (e.g., messages, files, etc.), query type, search area selection (e.g., "global" v. "narrow"), or time. Each search result may optionally include an indication of the messages format 565 and/or a time stamp 564 to provide additional information to the user. A given implementation may also optionally employ an "Other Results" feed 566 as a part of the same user interface that displays the search results 563. Such other results could include, for example, information pertaining to a user's contacts, such as an indication that a user was a source of a particular message or group of messages, or that a particular user was the source of particular documents. These results could come from sources other than traditional message-related sources, and exist in other formats, e.g., a user's personal file collection stored in a centralized database, data object of various formats (e.g., personal profile information from contacts of the user, images files, video files, audio files, and any other file/data object that can be indexed as disclosed herein). Search results could also include tags corresponding to portions of visual files/visual data objects. As discussed in detail above, such tags may be generated by an image analyzer system, which analyzes pictures and/or videos. The possible sources and results identified are included by way of illustration, not limitation.

Examples

The following examples pertain to further embodiments.

Example 1 is a non-transitory computer readable medium comprising computer readable instructions, which, upon execution by one or more processing units, cause the one or more processing units to: receive a media file for a user, wherein the media file includes one or more objects; automatically analyze the media file using computer vision models responsive to receiving the media file; generate tags for the image responsive to automatically analyzing the media file; filter the tags using Natural Language Processing (NLP) models; and utilize information obtained during filtering of the tags to fine-tune one or more of the computer vision models and the NLP models, wherein the media file includes one of an image or a video.

Example 2 includes the subject matter of Example 1, wherein the instructions to filter the tags using NLP models further comprise instructions that when executed cause the one or more processing units to select tags that are conceptually closer.

Example 3 includes the subject matter of Example 1, wherein the instructions to train each of the computer vision models and the NLP models further comprise instructions that when executed cause the one or more processing units to recheck outlier tags in an image corpus for accuracy of the outlier tag.

Example 4 includes the subject matter of Example 1, wherein the instructions to automatically analyze the media file further comprise instructions that when executed cause the one or more processing units to automatically analyze the media file using one or more of an object segmentation model, object localization model or object detection model.

Example 5 includes the subject matter of Example 1, wherein the instructions further comprise instructions that when executed cause the one or more processing units to analyze the media file using an object segmentation model for identifying the extent of distinct objects in the image.

Example 6 includes the subject matter of Example 1, wherein the instructions further comprise instructions that when executed cause the one or more processing units to implement an object detection and recognition model and an object localization model in parallel.

Example 7 includes the subject matter of Example 6, wherein the instructions further comprise instructions that when executed cause the one or more processing units to implement the object detection and recognition model to determine tags related to general categories of items in the image.

Example 8 includes the subject matter of Example 1, wherein the instructions further comprise instructions that when executed cause the one or more processing units to implement the object localization model to identify the location of distinct objects in the image.

Example 9 is a system, comprising: a memory; and one or more processing units, communicatively coupled to the memory, wherein the memory stores instructions to cause the one or more processing units to: receive an image for a user, wherein the image includes one or more objects; automatically analyze the image using computer vision models responsive to receiving the media file; generate tags for the image responsive to automatically analyzing the image; filter the tags using Natural Language Processing (NLP) models; and utilize information obtained during filtering of the tags to fine-tune one or more of the computer vision models and the NLP models, wherein the media file includes one of an image or a video.

Example 10 includes the subject matter of Example 9, the memory further storing instructions to cause the one or more processing units to select tags that are conceptually closer responsive to filtering the tags using NLP models.

Example 11 includes the subject matter of Example 9, the memory further storing instructions to cause the one or more processing units to recheck outlier tags in an image corpus for accuracy of the outlier tag.

Example 12 includes the subject matter of Example 9, the memory further storing instructions to cause the one or more processing units to automatically analyze the image using one or more of an object segmentation model, object localization model or object detection model.

Example 13 includes the subject matter of Example 9, the memory further storing instructions to cause the one or more processing units to analyze the media file using an object segmentation model for identifying the extent of distinct objects in the image.

Example 14 includes the subject matter of Example 9, the memory further storing instructions to cause the one or more processing units to implement an object detection model and an object localization model in parallel.

Example 15 includes the subject matter of Example 14, the memory further storing instructions to cause the one or more processing units to implement the object detection model to determine tags related to general categories of items in the image.

Example 16 includes the subject matter of Example 9, the memory further storing instructions to cause the one or more processing units to implement the object localization model for identifying the location of distinct objects in the image.

Example 17 is a computer-implemented method, comprising: receiving an image for a user, wherein the image includes one or more objects; automatically analyzing the image using computer vision models responsive to receiving the media file; generating tags for the image responsive to automatically analyzing the image; filtering the tags using Natural Language Processing (NLP) models; and utilizing information obtained during filtering of the tags to fine-tune one or more of the computer vision models and the NLP models.

Example 18 includes the subject matter of Example 17, further comprising selecting tags that are conceptually closer responsive to filtering the tags.

Example 19 includes the subject matter of Example 17, further comprising rechecking outlier tags in an image corpus for accuracy of the outlier tags.

Example 20 includes the subject matter of Example 17, further comprising automatically analyzing the image using one or more of an object segmentation model, object localization model or object detection model.

Example 21 includes the subject matter of Example 17, further comprising analyzing the media file using an object segmentation model for identifying the extent of distinct objects in the image.

Example 22 includes the subject matter of Example 17, further comprising implementing an object detection model and an object localization model in parallel.

Example 23 includes the subject matter of Example 22, further comprising implementing the object detection model to determine tags related to general categories of items in the image.

Example 24 includes the subject matter of Example 17, further comprising implementing the object localization model to identify a location of distinct objects in the image.

Example 25 includes the subject matter of Example 24, further comprising searching for visually similar objects in a dataset.

Example 26 includes the subject matter of Example 21, further comprising searching for visually similar objects in a dataset.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer readable medium comprising computer readable instructions, which, upon execution by one or more processing units, cause the one or more processing units to:
    receive one or more media files comprising one or more objects;
    automatically analyze the one or more media files using a plurality of computer vision models responsive to receiving the one or more media files, wherein automatically analyzing the one or more media files comprises:
        determining content associated with the one or more media files; and
        running a subset of the plurality of computer vision models based on the content;
    generate computer vision tags for the media file responsive to automatically analyzing the one or more media files, wherein each of the computer vision tags comprises a determined confidence value;
    determine a prioritization of the generated computer vision tags based on one or more Natural Language Processing models;
    filter the generated computer vision tags based on the prioritization;
    identify a set of the generated computer vision tags having highest confidence values of the determined confidence values of the computer vision tags;
    identify one of the generated computer vision tags having one of the determined confidence values at or below a predetermined threshold;
    determine that the one of the generated computer vision tags is an irrelevant tag based on reprocessing the one of the generated computer vision tags using the plurality of computer vision models and the one or more Natural Language Processing models;
    prioritize the filtered generated computer vision tags based on the determined confidence values of the generated computer vision tags, wherein prioritizing the filtered generated computer vision tags comprises ranking the filtered generated computer vision tags by increasing the prioritization of the set of the filtered generated computer vision tags and decreasing the prioritization of the irrelevant tag; and
    associate the prioritized filtered generated computer vision tags with the one or more media files.

2. The non-transitory computer readable medium of claim 1, wherein the one or more image analyzer models comprises one or more models of object segmentation, object localization, object detection/recognition, natural language processing, or a relevance feedback loop.

3. The non-transitory computer readable medium of claim 1, wherein the computer readable instructions which, upon execution by the one or more processing units, cause the one or more processing units to prioritize the filtered generated computer vision tags further comprise instructions that, when executed, cause the one or more processing units to:
    re-rank, via an inter-level tag filtering, the determined confidence values of the generated computer vision tags;
    prioritize the filtered tags based on the re-ranked confidence values of the generated computer vision tags; and
    select the prioritized generated computer vision tags with highest confident values.

4. The non-transitory computer readable medium of claim 1, wherein the computer readable instructions which, upon execution by the one or more processing units, cause the one or more processing units to prioritize the filtered generated computer vision tags further comprise instructions that, when executed, cause the one or more processing units to:
    detect one or more outliers based on inference of natural meanings of the generated computer vision tags.

5. The non-transitory computer readable medium of claim 4, wherein the computer readable instructions which, upon execution by the one or more processing units, cause the one or more processing units to filter using intra-level filtering to produce a natural hierarchy of the generated computer vision tags by removing the one or more outliers.

6. The non-transitory computer readable medium of claim 1, wherein the computer readable instructions which, upon execution by the one or more processing units, cause the one or more processing units to filter the generated computer vision tags further comprise instructions that, when executed, cause the one or more processing units to:
    de-noise the generated computer vision tags by detecting conceptual similarities to prioritize similar tags and de-prioritize dissimilar tags.

7. The non-transitory computer readable medium of claim 1, wherein the computer readable instructions which, upon execution by the one or more processing units, cause the one or more processing units to filter the generated computer vision tags further comprise instructions that, when executed, cause the one or more processing units to:
  filter the generated computer vision tags based, at least in part, on a spatial layout of the one or more objects within the one or more media files.

8. The non-transitory computer readable medium of claim 1, wherein the computer readable instructions which, upon execution by the one or more processing units, cause the one or more processing units to adjust the priority of one or more of the generated computer vision tags further comprise instructions that, when executed, cause the one or more processing units to:
  adjust the priority of a given generated computer vision tag based on an estimated depth of an object in the image that is associated with the given generated computer vision tag.

9. A system, comprising:
  a memory; and
  one or more processing units, communicatively coupled to the memory, wherein the memory stores instructions, when executed, cause the one or more processing units to:
    receive a media file comprising an image or a video, wherein the media file includes one or more objects;
    automatically analyze the media file using computer vision models responsive to receiving the media file, wherein automatically analyzing the media file comprises:
      determining content associated with the media file;
      utilizing a subset of the plurality of computer vision models with the content;
    generate computer vision tags for the media file responsive to automatically analyzing the media file, wherein each of the computer vision tags comprises a determined confidence value;
    determine a prioritization of the computer vision tags based on one or more Natural Language Processing models;
    filter the computer vision tags based on the prioritization, wherein the instructions to filter comprise using an inter-level tag filtering to re-rank determined confidence values of the computer vision tags;
    identify a set of the computer vision tags having highest confidence values of the determined confidence values of the computer vision tags;
    identify one of the computer vision tags having one of the determined confidence values at or below a predetermined threshold;
    determine that the one of the computer vision tags is an irrelevant tag based on reprocessing the one of the computer vision tags using the plurality of computer vision models and the one or more Natural Language Processing models;
    select the computer vision tags based on the determined confidence values of the computer vision tags, wherein selecting the computer vision tags comprises ranking the computer vision tags by increasing the prioritization of the set of the computer vision tags and decreasing the prioritization of the irrelevant tag; and
    associate the selected computer vision tags with the media file.

10. The system of claim 9, wherein the instructions, when executed, cause the one or more processing units to filter the computer vision tags further comprise instructions that, when executed, cause the one or more processing units to:
  accumulate confidence values of the selected computer vision tags; and
  select the selected computer vision tags with highest confident values.

11. The system of claim 9, wherein the instructions, when executed, cause the one or more processing units to filter the computer vision tags further comprise instructions that, when executed, cause the one or more processing units to:
  detect one or more outliers based on inference of natural meanings of the computer vision tags,
    wherein the instructions, when executed, cause the one or more processing units to filter using intra-level filtering to produce a natural hierarchy of the computer vision tags by removing the one or more outliers.

12. The system of claim 11, wherein the computer vision tags for the media file are generated via one or more image analyzer models comprising an object segmentation model, an object localization model, an object detection/recognition model, a natural language processing model, or a relevance feedback loop model.

13. The system of claim 9, wherein the instructions, when executed, cause the one or more processing units to filter the computer vision tags further comprise instructions that, when executed, cause the one or more processing units to:
  de-noise the computer vision tags by detecting conceptual similarities to prioritize similar computer vision tags and de-prioritize dissimilar computer vision tags.

14. The system of claim 9, wherein the instructions, when executed, cause the one or more processing units to filter the computer vision tags further comprise instructions that, when executed, cause the one or more processing units to:
  filter the computer vision tags based, at least in part, on a spatial layout of the one or more objects within the media file.

15. A computer-implemented method, comprising:
  receiving a media file comprising one or more objects;
  automatically analyzing the media file using a plurality of computer vision models responsive to receiving the media file, wherein automatically analyzing the media file comprises:
    determining content associated with the media file; and
    running a subset of the plurality of computer vision models using the content;
  generating computer vision tags for the media file responsive to automatically analyzing the media file, wherein each tag comprises a determined confidence value;
  determining a prioritization of the computer vision tags based on one or more Natural Language Processing models;
  filtering the computer vision tags based on the prioritization and via an inter-level tag filtering;
  identify a set of the computer vision tags having highest confidence values of the determined confidence values of the computer vision tags;
  identify one of the computer vision tags having one of the determined confidence values at or below a predetermined threshold;
  determine that the one of the computer vision tags is an irrelevant tag based on reprocessing the one of the computer vision tags using the plurality of computer vision models and the one or more Natural Language Processing models;

prioritizing the computer vision tags based on the determined confidence values of the computer vision tags, wherein the prioritizing comprises ranking the computer vision tags by increasing the prioritization of the set of the computer vision tags and decreasing the prioritization of the irrelevant tag; and associating the prioritized computer vision tags with the media file.

16. The method of claim 15, wherein the computer vision tags for the media file are generated via one or more image analyzer models comprising an object segmentation model, an object localization model, an object detection/recognition model, a natural language processing model, or a relevance feedback loop model.

17. The method of claim 15, wherein the computer vision tags are filtered based on analysis by one or more natural language processing models.

18. The method of claim 15, further comprising:

accumulating confidence values of the prioritized computer vision tags; and selecting the prioritized computer vision tags with highest confident values.

19. The method of claim 15, further comprising:

detecting one or more outliers based on inference of natural meanings of the computer vision tags, wherein the computer vision tags are further filtered via an intra-level filtering to produce a natural hierarchy of the computer vision tags by removing the one or more outliers.

20. The method of claim 15, further comprising:

de-noising the computer vision tags by detecting conceptual similarities to prioritize similar computer vision tags and de-prioritize dissimilar computer vision tags.

* * * * *